United States Patent
Chen

(10) Patent No.: US 9,172,207 B2
(45) Date of Patent: Oct. 27, 2015

(54) LASER BEAM COMBINING DEVICE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 68 days.

(21) Appl. No.: 14/066,741

(22) Filed: Oct. 30, 2013

(65) Prior Publication Data
US 2014/0362881 A1    Dec. 11, 2014

(30) Foreign Application Priority Data

Jun. 7, 2013   (TW) .............................. 102120370 U

(51) Int. Cl.
*G02B 5/30* (2006.01)
*H01S 3/23* (2006.01)
*G02B 27/10* (2006.01)
*G02B 27/14* (2006.01)
*H01S 3/00* (2006.01)

(52) U.S. Cl.
CPC .......... *H01S 3/2391* (2013.01); *G02B 27/1006* (2013.01); *G02B 27/14* (2013.01); *H01S 3/005* (2013.01)

(58) Field of Classification Search
CPC ... H01S 3/2391; H01S 3/005; G02B 27/1006; G02B 27/14; G02B 27/28; G02B 27/283; G02B 5/3058
USPC .............. 359/485.05, 485.06, 487.03; 353/20
See application file for complete search history.

(56) References Cited

U.S. PATENT DOCUMENTS

| | | | |
|---|---|---|---|
| 9,028,070 B2* | 5/2015 | Tomiyama et al. | 353/20 |
| 2008/0158511 A1* | 7/2008 | Takenaka et al. | 353/20 |
| 2010/0238966 A1* | 9/2010 | Mochizuki | 372/99 |
| 2011/0170187 A1* | 7/2011 | Sawaki | 359/485.03 |
| 2011/0193814 A1* | 8/2011 | Gay et al. | 345/173 |
| 2011/0216396 A1* | 9/2011 | Ouderkirk et al. | 359/352 |
| 2011/0310329 A1* | 12/2011 | Kumai | 349/62 |
| 2012/0224147 A1* | 9/2012 | Tomiyama et al. | 353/20 |
| 2012/0314188 A1* | 12/2012 | Tominaga et al. | 353/20 |
| 2013/0120672 A1* | 5/2013 | Kumai | 349/5 |
| 2013/0169894 A1* | 7/2013 | Ouderkirk et al. | 349/9 |
| 2013/0222770 A1* | 8/2013 | Tomiyama | 353/20 |
| 2013/0242391 A1* | 9/2013 | Minemura et al. | 359/485.01 |
| 2013/0286358 A1* | 10/2013 | Takahashi et al. | 353/20 |

* cited by examiner

*Primary Examiner* — Frank Font
(74) *Attorney, Agent, or Firm* — Novak Druce Connolly Bove + Quigg LLP

(57) ABSTRACT

A laser beam combining device includes three lasers, a polarizer, and a mode converter. The second laser device, the mode converter, and the third laser device are located on a first straight line in that order. The polarizer intersects with the first straight line at an imaginary joint point. An included angle between the first straight line and the polarizer is about 45 degrees. The polarizer and the mode converter are positioned between the second laser device and the third laser device. The polarizer is adjacent to the second laser device. The mode converter is adjacent to the third laser device. The first laser device faces the polarizer and is located on a second straight line perpendicular to the first straight line and passing through the joint point. The three laser devices emit TE mode red, green and blue laser beams, respectively.

7 Claims, 2 Drawing Sheets

LASER BEAM COMBINING DEVICE

BACKGROUND

1. Technical Field

The present disclosure relates optic technologies, and particularly relates to a laser beam combining device.

2. Description of Related Art

A laser is a device that only emits a single color of light coherently. Lasers have many important applications. They are used in display devices such as laser projectors and liquid crystal displays. In detail, first, three lasers respectively emit red laser beams, green laser beams, and blue laser beams. Second, the three colors of laser beams are mixed to form white light beams. Third, the white light beams are guided into micro-mirrors in the laser projector or into a guide plate in the liquid crystal display. However, it is difficult to mix the three colors of laser beams to form white light beams because laser beams have high degree of collimation.

Therefore, it is desirable to provide a laser beam combining device, to overcome or at least alleviate the above-mentioned problems.

DETAILED DESCRIPTION

Figure 1:
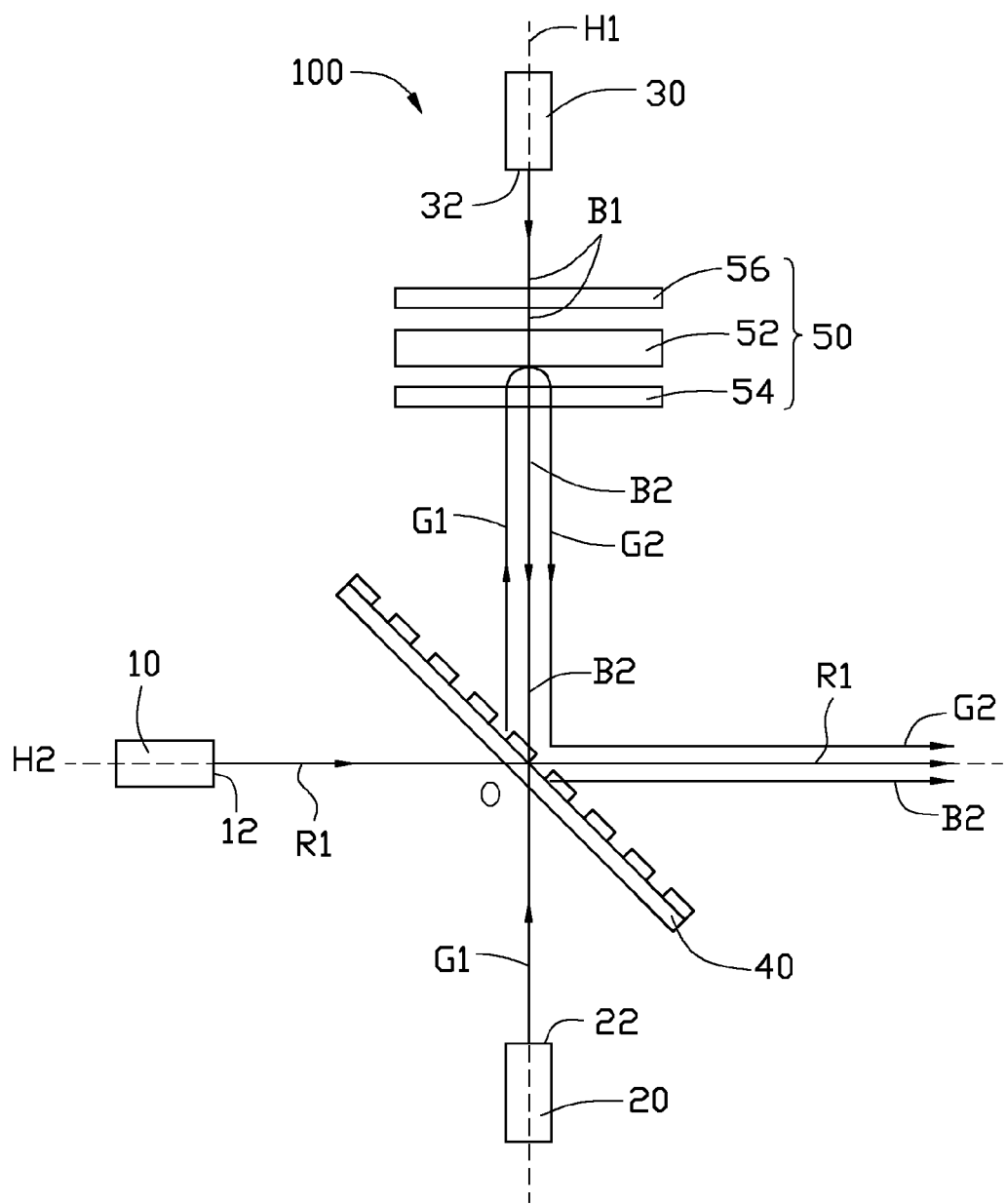
FIG. 1 is a schematic view of a laser beam combining device including a polarizer, according to an exemplary embodiment.

FIG. 1 shows a laser beam combining device 100 according to an exemplary embodiment. The laser beam combining device 100 includes a first laser device 10, a second laser device 20, a third laser device 30, a polarizer 40, and a mode converter 50.

The second laser device 20, the mode converter 50, and the third laser device 30 are located on a first straight line H1. The polarizer 40 intersects with the first straight line H1 at an imaginary joint point O. An included angle between the polarizer 40 and the first straight line H1 is about 45 degrees. The polarizer 40 and the mode converter 50 are located between the second laser device 20 and the third laser device 30. The polarizer 40 is positioned adjacent to the second laser device 20, and the mode converter 50 is positioned adjacent to the third laser device 30. In this embodiment, a second light emitting surface 22 of the second laser device 20 and a third light emitting surface 32 of the third laser device 30 both face the polarizer 40. A center of the second light emitting surface 22, a center of the polarizer 40, a center of the mode converter 50, and a center of the third light emitting surface 32 are located on the first straight line H1. A first light emitting surface 12 of the first laser device 10 faces the polarizer 40. A center of the first light emitting surface 12 is located on a second straight line H2 which passes through the joint point O and is perpendicular to the first straight line H1. The first laser device 10 is configured for emitting transverse electric (TE) mode red laser beams R1 to the joint point O. The second laser device 20 is configured for emitting TE mode green laser beams G1 to the joint point O. The third laser device 30 is configured for emitting TE mode blue laser beams B1 to the mode converter 50.

Figure 2:
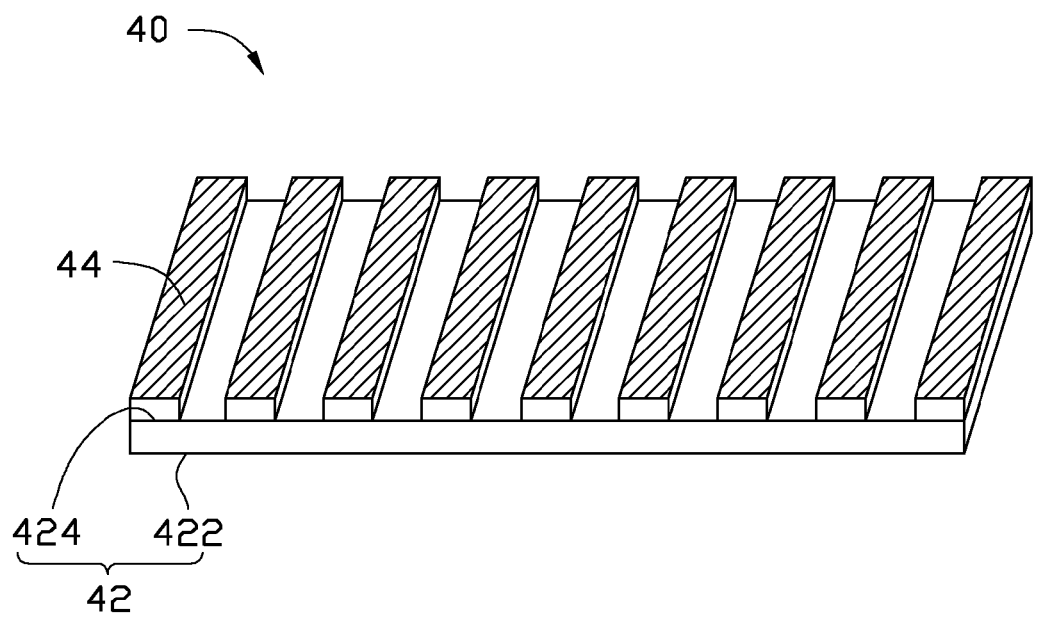
FIG. 2 is a schematic, isometric view of the polarizer of FIG. 1.

FIG. 2 shows that the polarizer 40 is a wire grid polarizer, and includes a base 42 and a number of metal strips 44. The base 42 includes a first surface 422 and a second surface 424. The first surface 422 and the second surface 424 are located at opposite sides of the base 42, and the first surface 422 is substantially parallel to the second surface 424. The metal strips 44 are arranged periodically on the second surface 424 and are substantially parallel to each other. An arrangement period of the metal strips 44 is less than half of the wavelength of blue laser beams. Thus, red laser beams, green laser beams, and blue laser beams pass through the polarizer 40 or are reflected by the polarizer 40, but diffraction of the red, green and blue laser beams are avoided. In this embodiment, the first laser device 10 and the second laser device 20 both face the first surface 422, and the third laser device 30 faces the second surface 424.

The mode converter 50 includes a reflection plate 52, a first quarter-wave plate 54, and a second quarter-wave plate 56. The first quarter-wave plate 54 and the second quarter-wave plate 56 are located at opposite sides of the reflection plate 52. The first quarter-wave plate 54 is positioned adjacent to the polarizer 54, and the second quarter-wave 56 is positioned adjacent to the third laser device 30. A center of the reflection plate 52, a center of the first quarter-wave plate 54, and a center of the second quarter-wave plate 56 are located on the first straight line H1, and the reflection plate 52, the first quarter-wave plate 54, and the second quarter-wave plate 56 are substantially perpendicular to the first straight line H1. An included angle between a partial polar axis of the first quarter-wave plate 54 and the polarization direction of the TE mode green laser beams G1 is about 45 degrees, and an included angle between a partial polar axis of the second quarter-wave plate 56 and the polarization direction of the TE mode blue laser beams B1 is about 45 degrees. The reflection plate 52 is a dichroic reflector and configured for allowing the blue laser beams B1 to pass through and is configured for reflecting the green laser beams.

Referring to FIG. 1, when in use, the three lasers 10, 20, and 30 simultaneously emit TE mode laser beams having different colors. In detail, the first laser device 10 emits TE mode red laser beams R1 to the joint point O. The second laser device 20 emits TE mode green laser beams G1 to the joint point O. The third laser device 30 emits TE mode blue laser beams B1 to the second quarter-wave plate 56. The TE mode red laser beams R1 passes through the polarizer 40 directly.

The TE mode green laser beams G1 directly pass through the polarizer 40 and the first quarter-wave plate 54 in sequence, and are then reflected by the reflection plate 52 back to the first quarter-wave plate 54, and finally pass through the first quarter-wave plate 54 to reach the joint point O. During the process, a linear polarity of the TE mode green laser beams G1 becomes circular polarity after first passing through the first quarter-wave plate 54. The TE mode green laser beams G1 becomes transverse magnetic (TM) mode green laser beams G2 after passing through the first quarter-wave plate 54 again. The TM mode green laser beams G2 are reflected by the polarizer 40 toward the TE mode red laser beams R1.

The TE mode blue laser beams B1 directly pass through the second quarter-wave plate 56, the reflection plate 52, and the first quarter-wave plate 54 in sequence to reach the joint point O. During the process, a linear polarity of the TE mode blue laser beams B1 becomes circular polarity after passing through the second quarter-wave plate 56. The TE mode blue laser beams B1 become TM mode blue laser beams B2 after passing through the first quarter-wave plate 54. The TM mode blue laser beams B2 are reflected by the polarizer 40 toward the TE mode red laser beams R1.

The TM mode green laser beams G2, the TM mode blue laser beams B2 and the TE mode red laser beams R1 are mixed to be collimated white light beams. It makes easier to mix the three colors of laser beams to be collimated white beams.

It should be noted that the TE mode green laser beams G1, the TM mode green laser beams G2 and the TM mode blue laser beams B2 are drawn to be separated from and parallel with each other. In fact, the TE mode green laser beams G1, the TM mode green laser beams G2 and the TM mode blue laser beams B2 are located on the first straight line H1. Similarly, the TE mode red laser beams R1, the TM mode green laser beams G2 and the TM mode blue laser beams B2 are drawn to be separated from and parallel with each other. In fact, the TE mode red laser beams R1, the TM mode green laser beams G2 and the TM mode blue laser beams B2 are located on the second straight line H2.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A laser beam combining device comprising a first laser device, a second laser device, a third laser device, a polarizer, and a mode converter, the second laser device, the mode converter, and the third laser device located on a first straight line and arranged in that order, the polarizer intersecting with the first straight line at an imaginary joint point, an included angle between the first straight line and the polarizer being about 45 degrees, the polarizer and the mode converter are positioned between the second laser device and the third laser device, the polarizer being adjacent to the second laser device, the mode converter being adjacent to the third laser device, the first laser device facing the polarizer and located on a second straight line which is perpendicular to the first straight line and passes through the joint point, the first laser device configured for emitting TE mode red laser beams to the joint point, the second laser device configured for emitting TE mode green laser beams to the joint point, and the third laser device configured for emitting TE mode blue laser beams to the mode converter.

2. The laser beam combining device of claim 1, wherein a center of a light emitting surface of the second laser device, a center of the polarizer, a center of the mode converter, and a center of a light emitting surface of the third laser device are located on the first straight line.

3. The laser beam combining device of claim 2, wherein a center of a light emitting surface of the first laser device is located on the second straight line.

4. The laser beam combining device of claim 1, wherein the polarizer comprises a base and a plurality of metal strips, the base comprises a first surface and a second surface at opposite sides thereof, the metal strips are arranged periodically on the second surface and are substantially parallel to each other, the first laser device and the second laser device both face the first surface, and the third laser device faces the second surface.

5. The laser beam combining device of claim 4, wherein the arrangement period of the metal strips is less than half of the wavelength of blue laser beams.

6. The laser beam combining device of claim 5, wherein the mode converter comprises a reflection plate, a first quarter-wave plate, and a second quarter-wave plate, the first quarter-wave plate and the second quarter-wave plate are located at opposite sides of the reflection plate, the first quarter-wave plate is positioned adjacent to the polarizer, the second quarter-wave is positioned adjacent to the third laser device, the first quarter-wave plate cooperate with the second quarter-wave plate to convert the TM mode blue laser beams to TE mode blue laser beams, and the second quarter-wave plate is configured to convert the TM mode green laser beams to TE mode green laser beams.

7. The laser beam combining device of claim 6, wherein the reflection plate, the first quarter-wave plate, and the second quarter-wave plate are substantially perpendicular to the first straight line, an included angle between the partial polar axis of the first quarter-wave plate and the polarization direction of the TE mode green laser beams is about 45 degrees, and an included angle between the partial polar axis of the second quarter-wave plate and the polarization direction of the TE mode blue laser beams is about 45 degrees.

* * * * *